Figure 1:
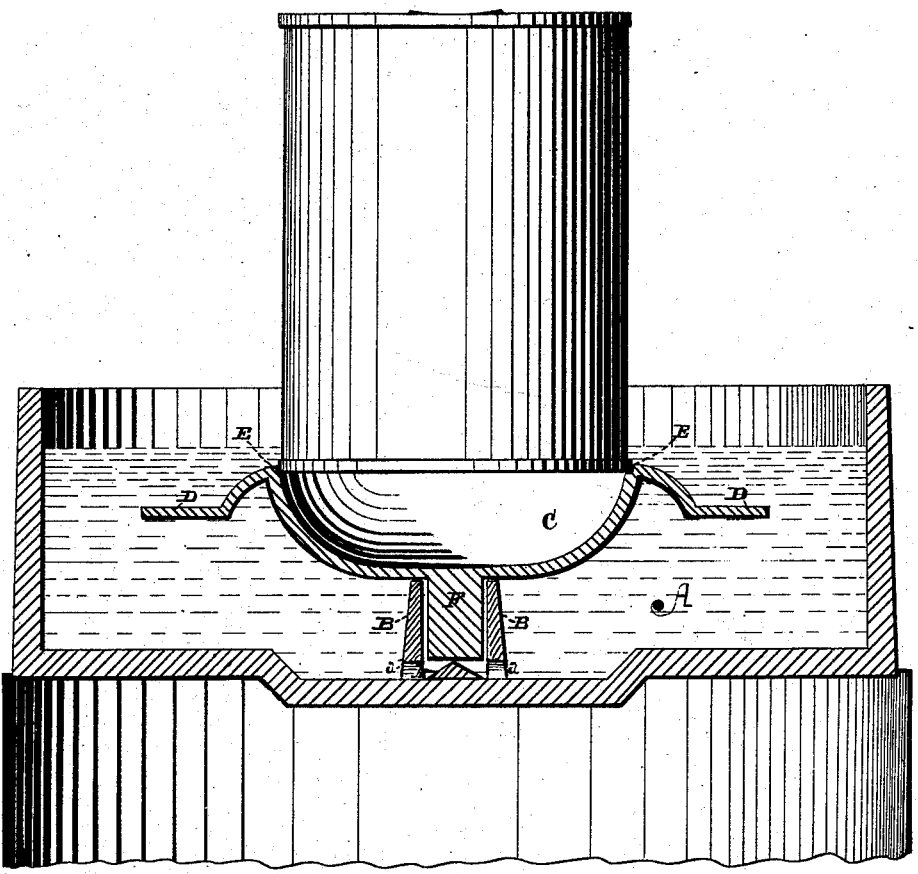

(No Model.)

A. LUSK.
SOLDERING APPARATUS.

No. 251,909.

Patented Jan. 3, 1882.

Witnesses
Frank A. Brooks
S. H. Rouse

Inventor
Albert Lusk
By Dewey
Attys

UNITED STATES PATENT OFFICE.

ALBERT LUSK, OF SAN FRANCISCO, CALIFORNIA.

SOLDERING APPARATUS.

SPECIFICATION forming part of Letters Patent No. 251,909, dated January 3, 1882.

Application filed July 18, 1881. (No model.)

*To all whom it may concern:*

Be it known that I, ALBERT LUSK, of the city and county of San Francisco, State of California, have invented an Improved Soldering Apparatus; and I hereby declare the following to be a full, clear, and exact description thereof.

My invention relates to certain improvements in apparatus for soldering the ends upon sheet-metal cans and other vessels; and it consists in an improved construction of a hollow cup-shaped close-bottomed float, which floats in a bath of melted solder, and has a ledge, upon which the can rests. The float is provided with a rigid central spindle or stem projecting from its bottom, so as to move up or down within a guiding-sleeve which projects upward from the bottom of the solder-pot, and thus keeps the float level while the can is being soldered.

It also consists in making one or more openings at the bottom of the sleeve, through which the solder may flow in when the float is released and rises to the surface, and through which it may be forced out into the pot when the float and spindle are depressed, so as to stir up the solder and keep it uniform throughout the pot.

Referring to the accompanying drawing for a more complete explanation of my invention, the figure is a vertical section of a solder-pot and float, showing my invention.

My invention is particularly applicable to that class of soldering apparatus in which a float or table of sufficient size to receive a can is placed in a pot or bath of melted solder, so that when the can is set upon the table it may be depressed until the solder flows around the rim and secures it, and when the can is removed the table is raised to the surface again. When made in the ordinary manner it is difficult to retain the table in a horizontal position, and the sides of the cans are unequally exposed to the solder, the table will not rise without the aid of a lever or spring, and the solder must be stirred occasionally to keep it properly mixed.

A is a pot or bath of sufficient size to contain a quantity of solder, which is kept in a melted state by means of a suitable furnace beneath. The central portion of the bottom may be slightly depressed, as shown, and from its center a hollow sleeve, B, rises.

The float C is cup-shaped, and has a flange or rim, D, around its periphery. The iron of which the float is made has nearly the same specific gravity as the solder, and will barely float in it, but would not rise to the surface with sufficient rapidity after being depressed without the aid of springs or levers. In my device the float is made in the form of a hollow cup with a tight bottom, and when a can is set upon the top of it the space is inclosed so that no solder can enter. This makes the float so buoyant that it will rise immediately to the surface when the pressure is removed without the aid of springs, levers or counter-weights. The buoyancy is so great that I have found it necessary to form the flange D around the periphery of the float, so that when depressed below the surface of the solder this flange retards the float and prevents its rising so rapidly as to throw the stem out of its socket. Around the upper inner edge of the depressed or cup-shaped portion is a narrow depressed ledge, E, of such a size as to just receive the end of the can or vessel to be soldered. From the bottom of the float a stem or guide-spindle, F, projects downward, and it is made of a size to just fit and slide easily within the sleeve B. This spindle is made solid with the float, and as it moves in the sleeve it prevents any side motion or tipping of the float. By this means I insure each can descending evenly into the solder, and a neat job is thus secured. But little if any solder can run into the float around the rim of the can, and what little may pass in is readily dipped out from time to time.

At the bottom of the sleeve B, I make two or more holes, *a*, which open horizontally outward, as shown. These holes serve to keep the space below the guiding-stem clear for its descent. As the solder flows into the space when the float and stem rise, it is forcibly ejected when a can is set upon the float and the latter is depressed. As the cans are soldered rapidly, this device acts as a sort of pump, and keeps the solder well stirred up by ejecting one or more streams from the bottom of the guide-stem into the mass in the pot, thus preventing any separation of the substances of which it is composed.

I am aware that vertically-moving tables or frames have been employed in soldering-machines to receive the bottom of a can, so that the latter may be immersed into a bath of molten solder by depressing the table, the table being either elevated or depressed by the aid of a spring, counter-weight, or lever. I am also aware that such can-supports have been made with holes in the bottom through which the solder might flow; and I do not claim either of these devices, because the specific gravities of the iron and the solder are so nearly alike that the can supporter or table will not rise after being depressed without the aid of some supplemental device.

In my apparatus a cup-shaped float is employed having a tight bottom, and when the can is placed upon the float the hollow space thus inclosed, together with the upward pressure upon the stem extending down into a sleeve into which the solder may flow freely below the stem, produces such a buoyancy that after the rim of the can has been immersed by the depression of the float the latter rises to the surface without other aid, and all supplemental devices are dispensed with. The stem also acts as a force-pump when the float is depressed, and thus ejects the solder within the sleeve through openings at the bottom, so as to stir up the solder in the pan and keep it homogeneous.

Having thus described my invention, what I claim as new, and desire to secure by Letters Patent, is—

In a soldering apparatus, the hollow float C, having its upper surface or rim fitted to receive the ends of cams, and provided with the rigid stem F, projecting from the bottom, in combination with a pot or bath, A, provided with the hollow vertical central guide-sleeve, B, to receive the stem, said sleeve having perforations at the bottom, through which the solder may flow in and act upon the bottom of the piston or stem F to assist in raising the float, and be ejected when the float is depressed, substantially as herein described.

In witness whereof I have hereunto set my hand.

ALBERT LUSK.

Witnesses:
GEO. H. STRONG,
S. H. NOURSE.